No. 728,468. Patented May 19, 1903.

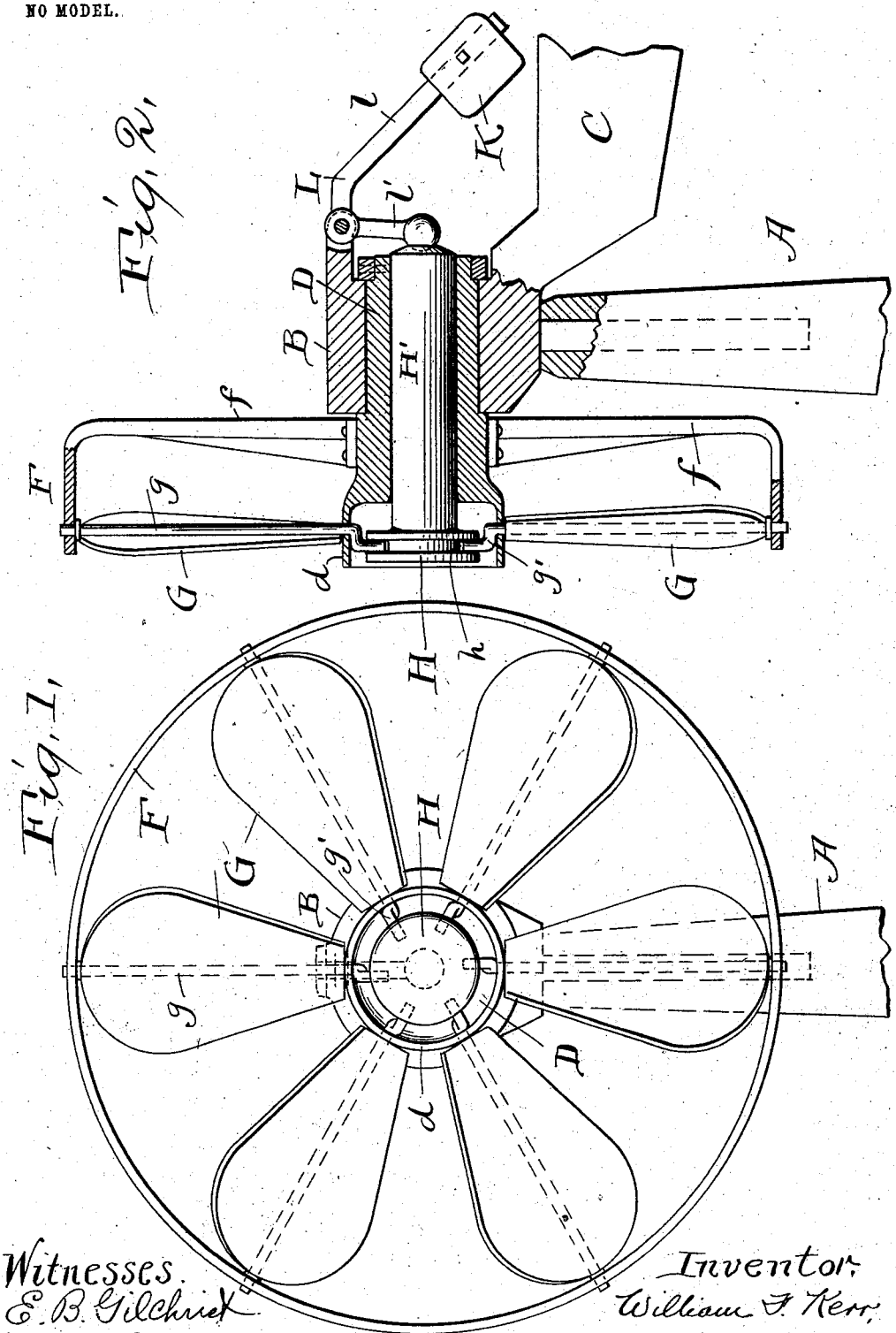

UNITED STATES PATENT OFFICE.

WILLIAM F. KERR, OF CLEVELAND, OHIO.

WINDMILL.

SPECIFICATION forming part of Letters Patent No. 728,468, dated May 19, 1903.

Application filed April 6, 1901. Serial No. 54,731. (No model.)

*To all whom it may concern:*

Be it known that I, WILLIAM F. KERR, a citizen of the United States, residing at Cleveland, in the county of Cuyahoga and State of Ohio, have invented a certain new and useful Improvement in Windmills, of which the following is a full, clear, and exact description, reference being had to the accompanying drawings.

The ultimate object of this invention is to provide a very simple and efficient windmill in which the blades shall be adjusted automatically in their angle to the wind according to the pressure of the wind, so that as the wind becomes greater it will strike the blades more obliquely, and vice versa, the result being that an even speed of rotation is obtained. Windmills having such operation broadly are already known in the art; but the purpose of my invention is to generally simplify and cheapen the construction and render it at once more efficient and durable.

The invention may be best summarized as consisting of the combinations of parts to this end, as hereinafter fully explained, and set out in the claims.

The drawings fully disclose my invention.

Figure 1 is a front elevation of a windmill made in accordance therewith, and Fig. 2 is a vertical central section thereof.

The same letters of reference designate the same part in each figure.

A represents a stationary support or tower for the windmill, of any suitable construction. Pivoted in this on a vertical axis is the housing B. Secured to this housing and projecting rearward is the vane C, which is adapted to swing the head of the windmill into the wind.

Rotatably journaled within the housing B is the sleeve D. On the forward end of this sleeve are a series of ears on an annular projection $d$, while this forward end also carries, by means of suitable spider-arms $f$, the ring F. The blades are designated G. Each may be a thin piece of metal, and it is secured to the axle $g$, which extends along its entire length and projects beyond each end thereof. At the outer end this axle is journaled in the ring F, and the inner end takes through the projection or ear $d$, wherefore the blade may be turned on this axis.

On the inner side of the projection $d$ the axles $g$ are cranked, as shown at $g'$, and the extreme ends of these cranks take into the groove $h$ of a sheave H, which is on the forward end of the plunger H'. This sheave may consist of a pair of collars on the plunger, as shown, or it may be a separate member secured rigidly or otherwise to the plunger, its essential characteristic being the recess or groove receiving the ends of the cranked axles. The plunger is slidable within the sleeve D, but is preferably rotatable with it. Therefore if this plunger is shifted longitudinally it acts on the cranks $g'$ to change the angle of the blades, and hence with a given wind velocity to change the speed of rotation, or, conversely, as the wind changes a suitable governor by shifting the plunger accordingly may preserve the speed of rotation.

The wind acting on the blades obliquely tends to turn them parallel with its direction, which is at right angles to the general plane of the windmill-head, and this action tends to drive the sheave and plunger inward. This action is counteracted by a suitable governor. As shown herein, this governor consists of a weight K, which hangs on the long arm $l$ of the bell-crank L, pivoted to a bracket extending from the housing B and having its short arm $l'$ bearing against the plunger H'. This weight is so placed that as it rises under the influence of the wind its leverage increases, wherefore an equilibrum is established between the force of the wind and that of the weight.

If the wind increases, it turns the blades more nearly parallel with its course and the weight rises, wherefore the wind has less effect on the blades in proportion, and the rotation is kept substantially constant. When the force of the wind decreases, the weight acting downward shifts the blades so that the wind acts on them to better advantage, wherefore the smaller wind-pressure gives substantially the same rotation.

The gist of the present invention lies in the sheave or groove at the forward end of the plunger, into which the cranked ends of the axles take. This is a very simple construction and is very efficient in service. It is cheaper to construct than any of the connections between the governor and blades with which I am familiar. It is also more durable and less liable to get out of order.

Having described my invention, I claim—

1. In a windmill, the combination of a sleeve, vanes and vane-supports carried by the sleeve, a plunger playing in the sleeve, collars in one end of the plunger, vane-pivots passing through the sleeve and having cranked ends playing in the groove, and a weighted governor operating directly upon the opposite end of the plunger, substantially as described.

2. In a windmill, the combination of a standard, a sleeve journaled in the standard, and a plunger playing in the sleeve, vanes and vane-supports attached to the sleeve, a recess in one head of the sleeve surrounding the end of the plunger, collars in the end of the plunger forming a groove, vane-pivots passing through the end of the sleeve and having cranked ends resting in the groove, and a weighted governor operating directly upon the plunger, substantially as described.

In testimony whereof I hereunto affix my signature in the presence of two witnesses.

WILLIAM F. KERR.

Witnesses:
ALBERT H. BATES,
H. M. WISE.